US011997373B2

(12) United States Patent
Maftei et al.

(10) Patent No.: US 11,997,373 B2
(45) Date of Patent: May 28, 2024

(54) CAMERA MODULE FOR A VEHICLE

(71) Applicant: VEONEER SWEDEN AB, Vargarda (SE)

(72) Inventors: Alexandru Maftei, Iasi (RO); Ovidiu Nita, Iasi (RO)

(73) Assignee: MAGNA ELECTRONICS SWEDEN AB, Vargarda (SE)

( * ) Notice: Subject to any disclaimer, the term of this patent is extended or adjusted under 35 U.S.C. 154(b) by 10 days.

(21) Appl. No.: 17/799,056

(22) PCT Filed: Feb. 16, 2021

(86) PCT No.: PCT/EP2021/053701
§ 371 (c)(1),
(2) Date: Aug. 11, 2022

(87) PCT Pub. No.: WO2021/165222
PCT Pub. Date: Aug. 26, 2021

(65) Prior Publication Data
US 2023/0068758 A1    Mar. 2, 2023

(30) Foreign Application Priority Data

Feb. 20, 2020  (EP) ..................... 20158385

(51) Int. Cl.
*H04N 23/54* (2023.01)
*H04N 23/51* (2023.01)
*H04N 23/56* (2023.01)
(52) U.S. Cl.
CPC ............. *H04N 23/54* (2023.01); *H04N 23/51* (2023.01); *H04N 23/56* (2023.01)

(58) Field of Classification Search
CPC ......... H04N 23/54; H04N 23/51; H04N 23/56
USPC .......................................................... 348/148
See application file for complete search history.

(56) References Cited

U.S. PATENT DOCUMENTS

| 5,757,004 | A | * | 5/1998 | Sandell .................. G08B 13/19 |
| | | | | 250/353 |
| 5,920,061 | A | | 7/1999 | Feng |
| 7,365,794 | B2 | | 4/2008 | Yasui |
| 8,413,531 | B2 | * | 4/2013 | Horibe .................... F16C 29/00 |
| | | | | 74/89.32 |
| 9,066,446 | B1 | | 6/2015 | Olsson et al. |
| 9,637,052 | B2 | | 5/2017 | Whitehead et al. |
| 9,644,836 | B1 | * | 5/2017 | Field ........................ F21S 4/28 |

(Continued)

FOREIGN PATENT DOCUMENTS

| WO | 2018219951 A1 | 5/2018 |
| WO | 2019164724 A1 | 8/2019 |

OTHER PUBLICATIONS

International Search Report and Written Opinion of PCT/EP2021/053701, dated Apr. 30, 2021.

*Primary Examiner* — Matthew David Kim
(74) *Attorney, Agent, or Firm* — DICKINSON WRIGHT PLLC

(57) ABSTRACT

A camera module (1) for a vehicle (2). A printed circuit board (11) of the camera module (1) has a carrier (10) for at least one camera (14, $14_1$, $14_2$, . . . , $14_N$). The carrier (10) is mounted directly to the printed circuit board (11). The printed circuit board (11) carries as well electronic components (18) and a connector (19).

8 Claims, 3 Drawing Sheets

(56) References Cited

U.S. PATENT DOCUMENTS

| | | | |
|---|---|---|---|
| 10,277,786 B1 | 4/2019 | Leonelli, Jr. | |
| 10,300,866 B2 | 5/2019 | Bingle et al. | |
| 10,397,453 B2 | 8/2019 | Choi et al. | |
| 10,681,253 B1* | 6/2020 | Vaaland | H04N 23/55 |
| 11,310,947 B2 | 4/2022 | Persson et al. | |
| 2004/0021792 A1 | 2/2004 | Yasui | |
| 2009/0229081 A1* | 9/2009 | Demuynck | H04M 1/0237 |
| | | | 16/362 |
| 2010/0271008 A1* | 10/2010 | Su | G01P 1/026 |
| | | | 324/173 |
| 2014/0267882 A1* | 9/2014 | O'Neill | G02B 13/001 |
| | | | 359/811 |
| 2015/0076184 A1* | 3/2015 | Achenbach | F16M 13/04 |
| | | | 224/181 |
| 2017/0036600 A1 | 2/2017 | Whitehead et al. | |
| 2017/0187931 A1 | 6/2017 | Onishi et al. | |
| 2018/0054553 A1 | 2/2018 | Choi et al. | |
| 2018/0222402 A1 | 8/2018 | Bingle et al. | |
| 2019/0110863 A1* | 4/2019 | Wilson | A61B 5/0088 |
| 2019/0208091 A1* | 7/2019 | Mleczko | H04N 23/55 |
| 2021/0127532 A1* | 4/2021 | Persson | H04N 23/57 |
| 2021/0274069 A1* | 9/2021 | Bull | H05K 7/1427 |

* cited by examiner

CAMERA MODULE FOR A VEHICLE

This application is a 35 U.S.C. § 371 national phase of PCT International Application No. PCT/EP2021/053701, filed Feb. 16, 2021, which claims the benefit of priority under 35 U.S.C. § 119 to European Patent Application No. EP 20158385.3, filed Feb. 20, 2020, the contents of which are incorporated herein by reference in their entirety.

FIELD OF THE INVENTION

The invention relates to a camera module for a vehicle.

BACKGROUND

International PCT Application Publication No. WO 2019/164724 A1 discloses a camera module assembly. An outer housing for the camera module includes a front shell with a window and a rear shell. The camera core includes a lens assembly, a sensor assembly, and a sensor housing. The sensor assembly is disposed within the sensor housing, and the sensor housing is fixed to the lens assembly.

International PCT Application Publication No. WO 2018/219951 A1 relates to a camera module for a motor vehicle. The camera module is used for driver monitoring in the passenger compartment. The camera module has at least one printed circuit board and a shield for enclosing said printed circuit board. The shield comprises at least a first shielding part and a second shielding part.

US Patent Publication No. 2019/208091 A1 discloses a camera module for a vehicular vision system. The camera module includes a metal front housing, a lens holder and a metal rear housing. The front housing houses a printed circuit board having an imager disposed thereat. The lens holder is attached at a front portion of the housing so that a lens assembly is optically aligned with the imager.

US Patent Publication No. 2018/222402 A1 discloses a camera housing portion which has an imaging sensor at a base portion of the camera housing portion. A lens system is at a first portion of the camera housing portion. A first circuit board is provided that includes circuitry associated with the imaging sensor, which is disposed at a second circuit board that is in board-to-board electrical connection with the first circuit board. The camera housing portion and a connector portion are joined together to encase the first and second circuit boards.

US Patent Publication No. 2017/187931 A1 discloses a vehicle-mounted camera. A camera circuit board is located behind the image sensor and mounted with the image sensor. A tabular main circuit board is located on the lower side of the camera main assembly and extending in the front-back direction and the left-right direction.

US Patent Publication No. 2018/054553 A1 discloses an electronic device which includes an upper cover unit including at least one first camera and a plurality of second camera pairs. A housing including a plurality of first openings, to which the plurality of second camera pairs are at least partially coupled to be exposed to an outside.

US Patent Publication No. 2004/021792 A1 discloses a camera module with a flexible substrate, wherein first and second camera units are mounted on the same face of the flexible substrate. The camera module can provide a configuration in which the directions of the fields of view of the two camera units are reverse to each other.

U.S. Pat. No. 9,066,446 B1 discloses thermal extraction architectures for heat-generating electronic devices such as cameras or lights. An electronic device such as a camera head may include a housing, a printed circuit board (PCB) within the housing, and a thermal extraction (heat sink) element positioned between the housing and PCB to transfer heat from the PCB to the housing and external environment.

US Patent Publication No. 2017/036600 A1 discloses a dual camera system for viewing a coupling of a hitch to a trailer. Two doors that open automatically by arms and linkages expose the video cameras when the vehicle is shifted into reverse.

In general, vision cameras are more and more present in vehicles. They are used for scanning the environment of the vehicle and also the driver and passengers, sending the data to an ECU (electronic control unit) that is processing the data and sending out warnings to the driver or acting on the vehicle brakes. The most advance vision cameras use two cameras working in stereo configuration to output also the distance. An algorithm is used and the ECU receives the distance to the object.

The algorithm works well if the cameras are aligned. However, reading errors occur when the cameras lose alignment. At present, the camera is mounted directly in the camera housing, and then the printed circuit board is mounted and connected to the camera. This means that a very tight tolerance is required for the camera housing where the camera is mounted. This generates high costs for the production of the housing. A thermal deformation of the housing, made from aluminium, is caused by thermal changes. The thermal deformation translates in a deviation of the visual axis, which leads to errors in reading. Furthermore, the mounting process of the camera to the housing takes a lot of time.

At present, vision systems use a vee-groove design, which is integrated in the housing, and three spheres in the camera module, which generate problems in mounting and in use, especially with thermal changes. For driver monitoring systems, a camera is used, which has a lens integrated in the housing and an image sensor which is installed on the printed circuit board, which generate assembly problems.

SUMMARY OF THE INVENTION

It is an object of the present invention to provide a camera module for a vehicle, the camera module having at least one camera, wherein the alignment of the at least one camera is not affected by temperature changes and the camera module is easy to manufacture and inexpensive.

The above object is achieved by embodiments of a camera as described herein.

According to an embodiment of the invention, the camera module for a vehicle comprises a printed circuit board. The printed circuit board carries a carrier for at least one camera, wherein the carrier is mounted directly to the printed circuit board. The carrier has a mounting structure for the at least one camera, wherein the mounting structure has a pair of rails and at least a pair of flexible wings. A chip housing of the at least one camera cooperates with the rails of the carrier in a form fitting manner. A lens body of the at least one camera cooperates with the flexible wings of the carrier in a form and force fitting manner. Electronic components and a connector are mounted as well to the printed circuit board.

According to an embodiment of the invention, the carrier for the at least one camera carries at least one illumination device. For example, the at least one illumination device comprises at least one IR (infra red) light emitting diode.

The advantage of the present invention is that with the carrier for the at least one camera, the camera module and therefore the alignment of each camera is not affected by temperature changes.

According to an embodiment of the present invention, the carrier has a mounting structure for the at least one camera. The mounting structure comprises a pair of rails and at least a pair of flexible wings. In a further embodiment, the camera has a chip housing, which cooperates with the rails of the carrier in a form fitting manner. A lens body of the camera cooperates with the flexible wings of the carrier in a form and force fitting manner.

The advantage is that each camera can be mounted to the carrier in a simple manner and the mounted camera is aligned as well in a simple manner, which saves time and money for the assembly.

The carrier may as well have a mounting structure for the at least one illumination device. For example, the mounting structure for the at least one illumination device comprises a flat abutting surface with a surrounding rim. The illumination device is held by a snap fit to the mounting structure.

In an embodiment, a housing is used, which surrounds the camera module with all the mounted components. The camera module is mounted in the housing with by the printed circuit board. In an embodiment, the housing comprises a housing base and a housing cover, both of which are joined together and form the housing. In an embodiment, the joined housing base and housing cover define a cut-out for the at least one camera, a cut-out for the at least one illumination device and a cut-out for the connector. After mounting the printed circuit board in the housing, the at least one camera, the at least one illumination device and the connector of the camera module are aligned with the respective cutouts.

The camera module with the carrier of the at least one camera and the at least one illumination device (for example, IR light emitting diode), the connector and the electronic components are arranged on the printed circuit board. The printed circuit board fits for mounting to the vehicle in the exterior housing of the vehicle.

According to a preferred embodiment, the printed circuit board and the housing of the camera module have positioning features to center and guide both of which into one another. The housing, for example the housing base, may have screw holes for fixing the printed circuit board directly to the housing, i.e. the housing base in this example. In an embodiment, the housing, i.e. the joined housing base and housing cover, has a cut-out feature for the at least one camera, a cut-out for the illumination device (for example, at least one IR-LED) and a cut-out for the connector. According to a further embodiment, the housing may have only one big cut-out for the carrier on which the at least one camera and the at least one illumination device (for example, at least one IR-LED) are mounted.

According to a preferred embodiment, the housing is made from an EMI (electromagnetic interference) shielding material or has a coating of an EMI shielding material. The housing may have cooling towers for the electronic components, which produce a lot of heat. Additionally, the housing may have cooling fins on its surface. A thermal paste can be used as a contact bridge between the electronic components that need to be cooled and the thermal towers. The housing may have a fan mounted on its surface; in this case, a cut-out for the fan connector is preferably provided in the housing. In an embodiment, the housing is fixed to the ECU through a vehicle interface by mounting bolts. The mounting of the housing is not limited to holes for mounting bolts. The housing may have also special holes or pins for guiding to the vehicle interface. The housing may have special clipping features for mounting it to the vehicle interface.

According to a further embodiment, the at least one camera and the at least one illumination device (for example, at least one IR-LED) have, for protection reason, an exterior cover, which also covers the assembly of the housing and the printed circuit board. The printed circuit board itself carries the carrier, the connector, the electronic components, the at least one camera and the at least one illumination device (IR-LEDs). If additional cooling is needed, a thermal pad can be used between the printed circuit board and the housing cover. The housing cover can be mounted and fixed to the housing base by using screws, but also clipping features or other suitable fixation means may be used. Additionally, a glue/silicone can be dispensed on the housing cover or housing base before mounting them together.

According to an embodiment of the invention, the carrier for at least one camera with at least one IR-LED is an integrated part of an active safety protection system. In an embodiment, the carrier for at least one camera with at least one IR-LED is mounted on a vehicle. In an embodiment, the carrier for at least one camera with at least one IR-LED is assembled directly to a printed circuit board. In an embodiment, the carrier for at least one camera with at least one IR-LED can carry one or more cameras. In an embodiment, the carrier for at least one camera with at least one IR-LED can carry one or more IR-LEDs. In an embodiment, the carrier for at least one camera with at least one IR-LED has traces within the carrier through which traces an electrical connection between the at least one camera and the printed circuit board and between the at least one illumination device and the printed circuit board is provided. In an embodiment, the carrier for at least one camera with at least one IR-LED has a connection interface to the camera. In an embodiment, the carrier for at least one camera with at least one IR-LED has a connection interface to the at least one IR-LED. In an embodiment, the carrier for at least one camera with at least one IR-LED has a connection interface to the printed circuit board. In an embodiment, the carrier for at least one camera with at least one IR-LED is mounted in the assembly with the printed circuit board, the camera, the at least one IR-LED, the electronic components and the connector. In an embodiment, the carrier for at least one camera with at least one IR-LED is able to communicate with other safety ECUs in the vehicle. In an embodiment, the carrier for at least one camera with at least one IR-LED is able to send signals to another ECU in the vehicle. In an embodiment, the carrier for at least one camera with at least one IR-LED has a housing base and a housing cover.

BRIEF DESCRIPTION OF THE DRAWINGS

The numerous advantages of the disclosure may be better understood by those skilled in the art by reference to the accompanying figures in which.

DETAILED DESCRIPTION

Figure 1:
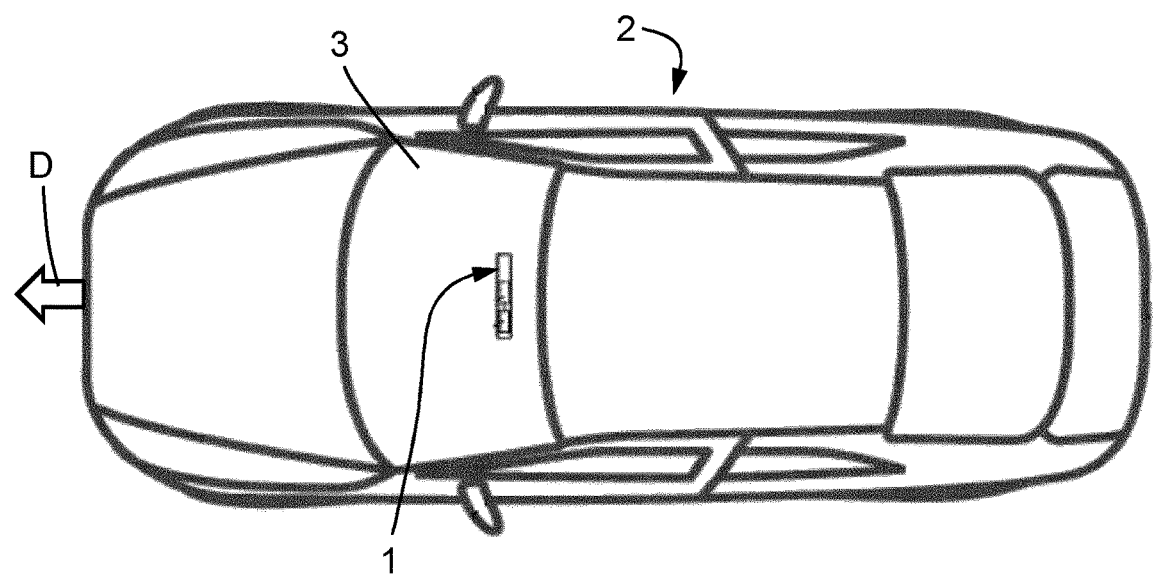
FIG. 1 is a plan view of a motor vehicle having at least one forward looking camera module according to an embodiment of the invention.

Same reference numerals used in this description refer to same elements or elements of similar function throughout the various figures. Furthermore, only reference numerals necessary for the description of the respective figure are shown in the figures. The shown embodiments represent only examples of how the invention can be carried out. This should not be construed as a limitation of the invention.

FIG. 1 shows a plan view of a motor vehicle 2. A camera module 1 according to an embodiment of the invention is mounted at a windshield 3 of the vehicle 2, so that the camera (see FIG. 3) of the camera module 1 is looking into the direction D of driving.

Figure 2:
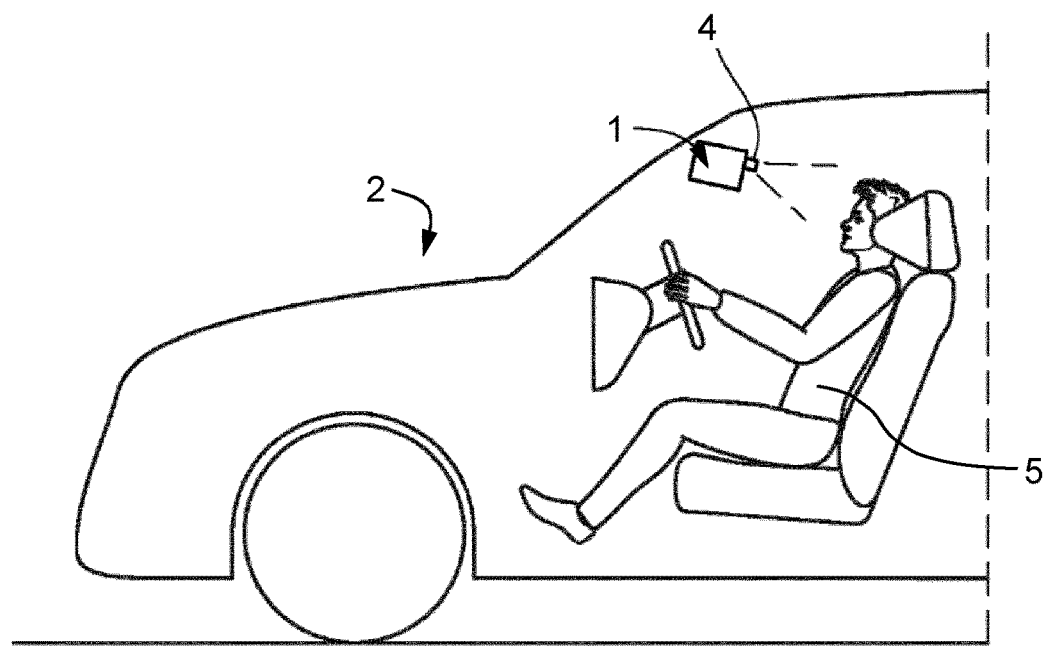
FIG. 2 is schematic representation of the placement of a camera module according to another embodiment of the invention looking at the driver of the motor vehicle.

FIG. 2 shows an arrangement of a camera module 1 according to another embodiment of the invention. A lens 4 of the camera module 1 is looking at a driver 5 of the vehicle 2.

Figure 3:
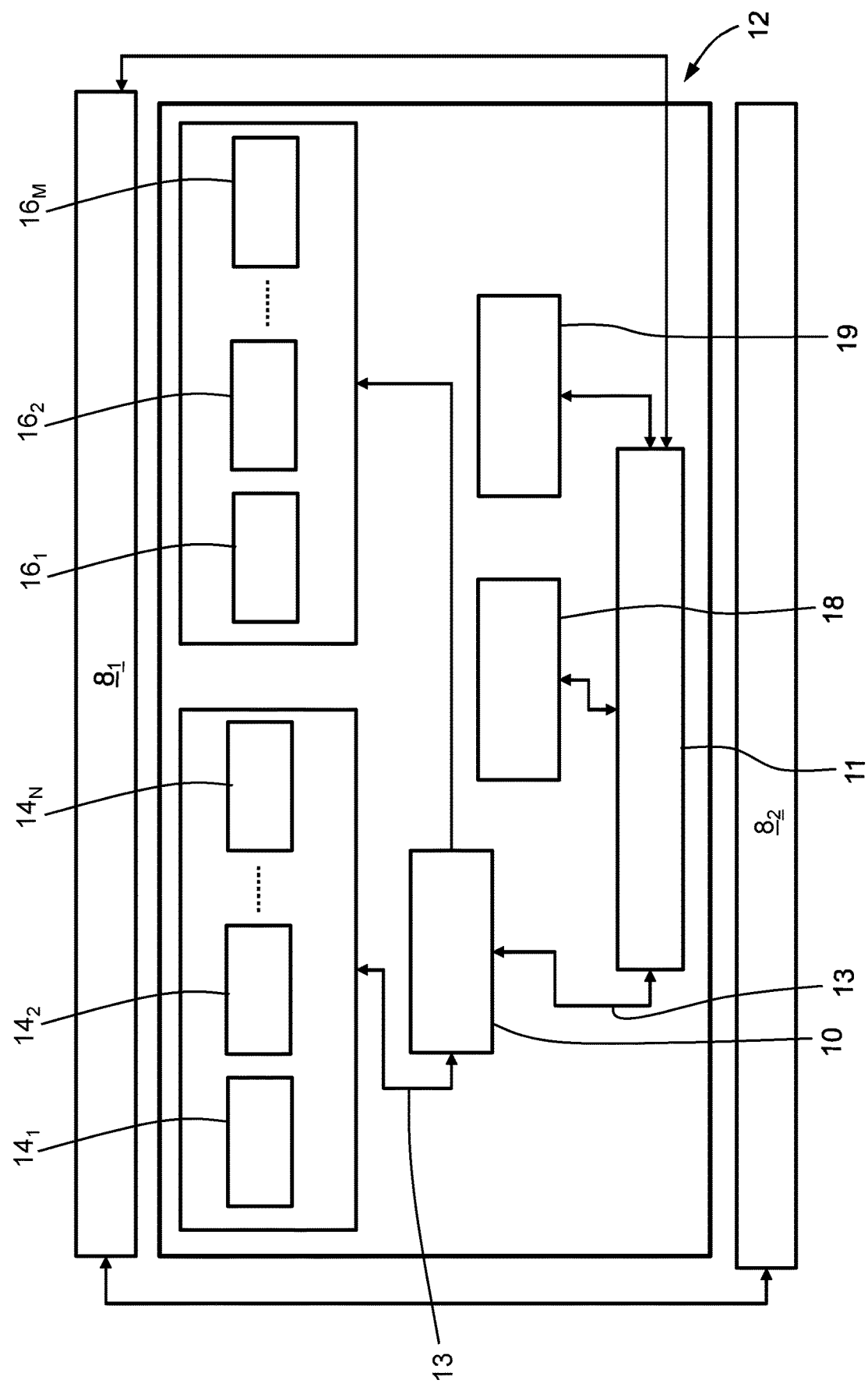
FIG. 3 is a schematic view of an electronic control unit which can be applied to at least one camera of the camera module according to an embodiment of the invention.

FIG. 3 shows a schematic view of an electronic control unit 12 which can be applied to at least one camera $14_1$, $14_2$, ..., $14_N$ of the camera module 1 according to an embodiment of the invention. Electronic control unit 12 can be applied to a camera module 1, wherein the camera module 1 comprises at least one external view camera $14_1$, $14_2$, ..., $14_N$ (see FIG. 1) or at least one driver 5 (see FIG. 2) viewing camera $14_1$, $14_2$, ..., $14_N$. The camera module 1 is composed of the printed circuit board 11 on which a carrier 10, a connector 19 and electronic components 18 are mounted. In the context of the present invention, a micro controller unit (not shown) is as well a part of the electronic components 18. In an embodiment, the carrier 10 has conductive traces (not shown) through which an electrical connection between the at least one camera $14_1$, $14_2$, ..., $14_N$ and the printed circuit board 11 and between the at least one illumination device $16_1$, $16_2$, ..., $16_M$ and the printed circuit board 11 is provided. The carrier 10 is designed for mounting the at least one camera $14_1$, $14_2$, ..., $14_N$ which are as well fixed in position by the carrier 10. In the case that the camera module 1 is used to monitor the driver, the carrier 10 also has space for at least one illumination device $16_1$, $16_2$, ..., $16_M$. The at least one illumination device $16_1$, $16_2$, ..., $16_M$ can be configured as an IR (infrared) light emitting diode (IR-LED).

The electronic connection 13 between the at least one camera $14_1$, $14_2$, ..., $14_N$ and the carrier 10 can be made by use of the surface mount technology (SMT) but it is not limited thereto. The electronic connection 13 between the carrier 10 and the printed circuit board 11 can also be made through SMT, but it is not limited thereto. In an embodiment, the printed circuit board 11 has guiding features (not shown) and holes (not shown) both of which facilitate the mounting of the printed circuit board 11. For protection reason, the camera module 1 is enclosed within a housing base $8_2$ and a housing cover $8_1$ both of which form a housing 7 when joined.

Figure 4:
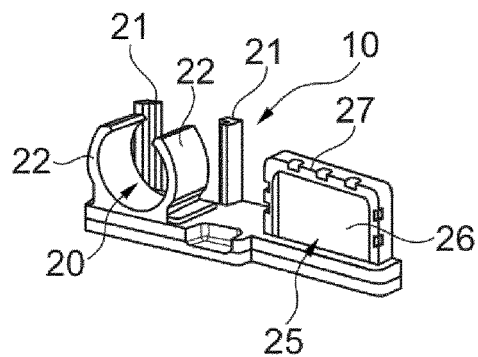
FIG. 4 is a perspective view of a carrier used for mounting the at least one camera according to an embodiment of the invention.

FIG. 4 is a perspective view of a carrier 10 used for mounting the at least one camera $14_1$, $14_2$, ..., $14_N$, according to an embodiment of the invention. The carrier 10, can be made from, but is not limited to, plastic, composite materials, casting alloys or sheet metal. The carrier 10 shown here is configured for mounting and fixing at least one camera $14_1$, $14_2$, ..., $14_N$ and at least one illumination device $16_1$, $16_2$, ..., $16_M$. According to the embodiment shown here, a mounting structure 20 for the at least one camera $14_1$, $14_2$, ..., $14_N$ comprises a pair of rails 21 and at least a pair of flexible wings 22. A mounting structure 25 of the carrier 10 for the at least one illumination device $16_1$, $16_2$, ..., $16_M$ comprises a flat abutting surface 26 with a surrounding rim 27.

Figure 5:
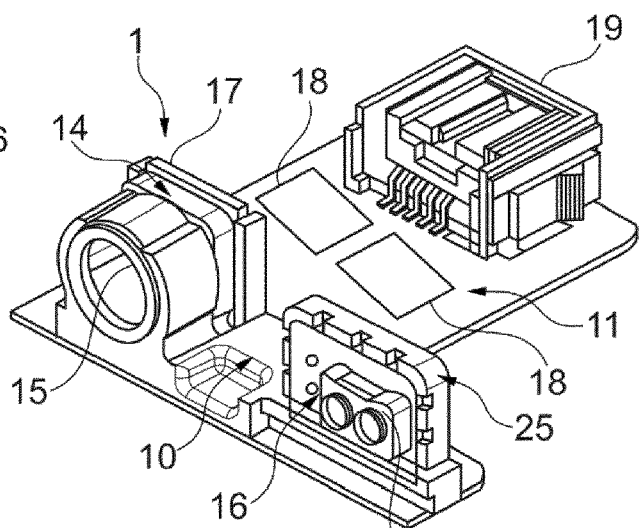
FIG. 5 is a perspective view of components of a camera module according to an embodiment of the invention mounted on a printed circuit board.

FIG. 5 is a perspective view of components of the camera module 1 according to an embodiment of the invention, mounted on a printed circuit board 11. The carrier 10, the connector 19 and the electronic components 18 are mounted on the printed circuit board 11. The carrier 10 mounts and fixes the at least one camera $14_1$, $14_2$, ..., $14_N$ and at least one illumination device $16_1$, $16_2$, ..., $16_M$. In the embodiment shown, the at least one camera $14_1$, $14_2$, ..., $14_N$ has a chip housing 17 and a lens body 15. The chip housing 17 cooperates with the rails 21 of the carrier 10 in a form fitting manner. The lens body 15 cooperates with the flexible wings 22 of the carrier 10 in a form and force fitting manner. The at least one illumination device $16_1$, $16_2$, ..., $16_M$ is held in the mounting structure 25 by a snap fit of the rim 27 in the carrier 10. The illumination device $16_1$, $16_2$, ..., $16_M$ comprises at least one light emitting diode 30 which is configured to emit IR light. The camera module 1 fully works when it has above mentioned components assembled and the electronic components 18, for example the microcontroller (MCU), has the required firmware flashed.

Figure 6:
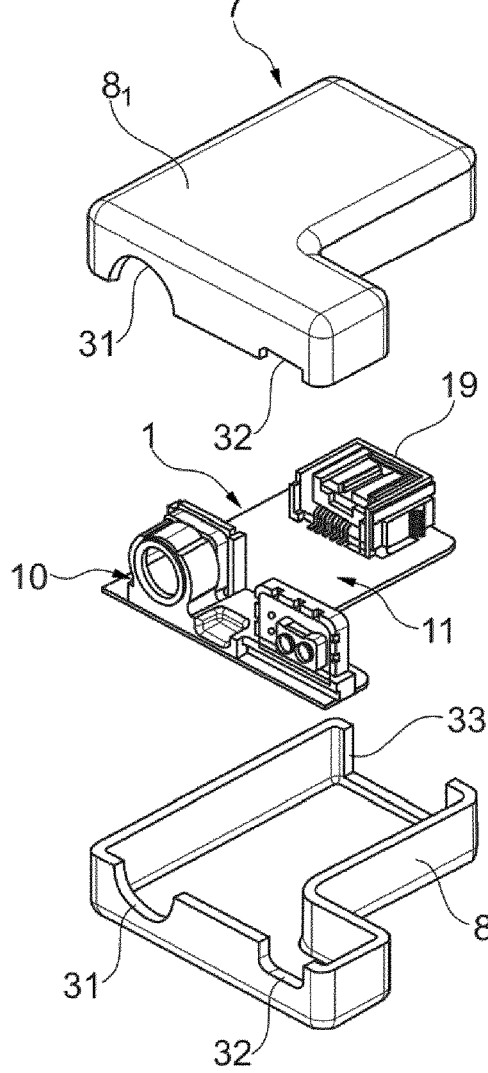
FIG. 6 is a perspective and exploded view of the camera module and the housing, which encloses the camera module shown in FIGS. 4 and 5.

FIG. 6 is a perspective and exploded view of the camera module 1 and the housing 7, which encloses the camera module 1 as shown in FIGS. 4 and 5. The carrier 10 with the at least one camera 14 (see FIG. 5) and the at least on illumination device 16 (see FIG. 5) is enclosed in a housing 7 for protection reason. The housing 7 comprises a housing base $8_2$ and a housing cover $8_1$. According to the embodiment shown here, the housing base $8_2$ and the housing cover $8_1$ are joined together to form the housing 7 with a cut-out 31 for the at least one camera 14 and a cut-out 32 for the at least one illumination device 16. Additionally, the housing base $8_2$ and the housing cover $8_1$ have a cut-out 33 for the connector 19.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

While the above description constitutes the preferred embodiment of the present invention, it will be appreciated that the invention is susceptible to modification, variation and change without departing from the proper scope and fair meaning of the accompanying claims.

The invention claimed is:

1. A camera module for a vehicle, comprising: at least one camera comprising,
    a printed circuit board,
    a carrier for the at least one camera mounted directly to the printed circuit board, wherein the carrier has a mounting structure for the at least one camera, wherein the mounting structure has a pair of rails and at least a pair of flexible wings;

a chip housing of the at least one camera cooperates with the rails of the carrier in a form fitting manner, and a lens body of the at least one camera cooperates with the flexible wings of the carrier in a form and force fitting manner; and electronic components and a connector mounted to the printed circuit board.

2. The camera module as claimed in claim 1, further comprising at least one illumination device carried by the carrier for the at least one camera.

3. The camera module as claimed in claim 2, wherein the at least one illumination device comprises at least one IR-light emitting diode.

4. The camera module as claimed in claim 2, wherein the carrier has a mounting structure for the at least one illumination device.

5. The camera module as claimed in claim 4, wherein the mounting structure for the at least one illumination device comprises a flat abutting surface with a surrounding rim and the illumination device is held by a snap fit to the mounting structure.

6. The camera module as claimed in claim 1, further comprising a housing which surrounds the camera module.

7. The camera module as claimed in claim 6, wherein the housing comprises a housing base and a housing cover the housing base and the housing cover joined together to form the housing.

8. The camera module as claimed in claim 7, wherein the housing base and the housing cover have a first cut-out for the at least one camera, a second cut-out for the at least one illumination device and a third cut-out for the connector, wherein the at least one camera, the at least one illumination device and the connector of the camera module are aligned with the respective first, second and third cut-outs.

* * * * *